(12) United States Patent
Salmon et al.

(10) Patent No.: US 8,458,507 B2
(45) Date of Patent: Jun. 4, 2013

(54) BUS FREQUENCY ADJUSTMENT CIRCUITRY FOR USE IN A DYNAMIC RANDOM ACCESS MEMORY DEVICE

(75) Inventors: Joe Salmon, Placerville, CA (US); Kuljit Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 12/163,663

(22) Filed: Jun. 27, 2008

(65) Prior Publication Data

US 2009/0327792 A1    Dec. 31, 2009

(51) Int. Cl.
*G06F 1/04*    (2006.01)
*G06F 1/10*    (2006.01)
*G06F 13/16*    (2006.01)

(52) U.S. Cl.
USPC ........... 713/501; 713/600; 713/500; 710/100; 710/300; 710/305; 711/100; 711/105

(58) Field of Classification Search
USPC ...... 713/400–401, 500–503, 600–601; 711/1, 711/2, 4, 5, 100, 105; 710/100, 300, 305
See application file for complete search history.

(56) References Cited

U.S. PATENT DOCUMENTS

| | | | | |
|---|---|---|---|---|
| 6,072,348 A | * | 6/2000 | New et al. | 327/295 |
| 7,035,962 B1 | * | 4/2006 | Ryan | 711/5 |
| 7,315,957 B1 | * | 1/2008 | Wagner et al. | 713/501 |
| 7,343,508 B2 | * | 3/2008 | Khodorkovsky | 713/500 |
| 7,417,474 B1 | * | 8/2008 | Jamal | 327/117 |
| 7,640,449 B2 | * | 12/2009 | Ham | 713/501 |

* cited by examiner

*Primary Examiner* — Fahmida Rahman
(74) *Attorney, Agent, or Firm* — Grossman, Tucker, Perreault & Pfleger, PLLC

(57) ABSTRACT

A clock divider circuitry and method for use in a dynamic random access memory device. The method may include receiving a clock input signal having a first frequency from a clock input receiver at clock divider circuitry, the clock divider circuitry including a flip-flop configured to generate an output signal, based at least in part, on an inverted output signal and the clock input signal. The output signal may have a second frequency that is a fraction of the first frequency. The method may further include receiving the clock input signal and the output signal at a multiplexer and generating a multiplexed output. The method may additionally include receiving the multiplexed output at a first bus configured to receive the multiplexed output and to reduce an operational frequency of the first bus in response to an increase in an operational frequency of a second bus associated with the memory device.

20 Claims, 4 Drawing Sheets

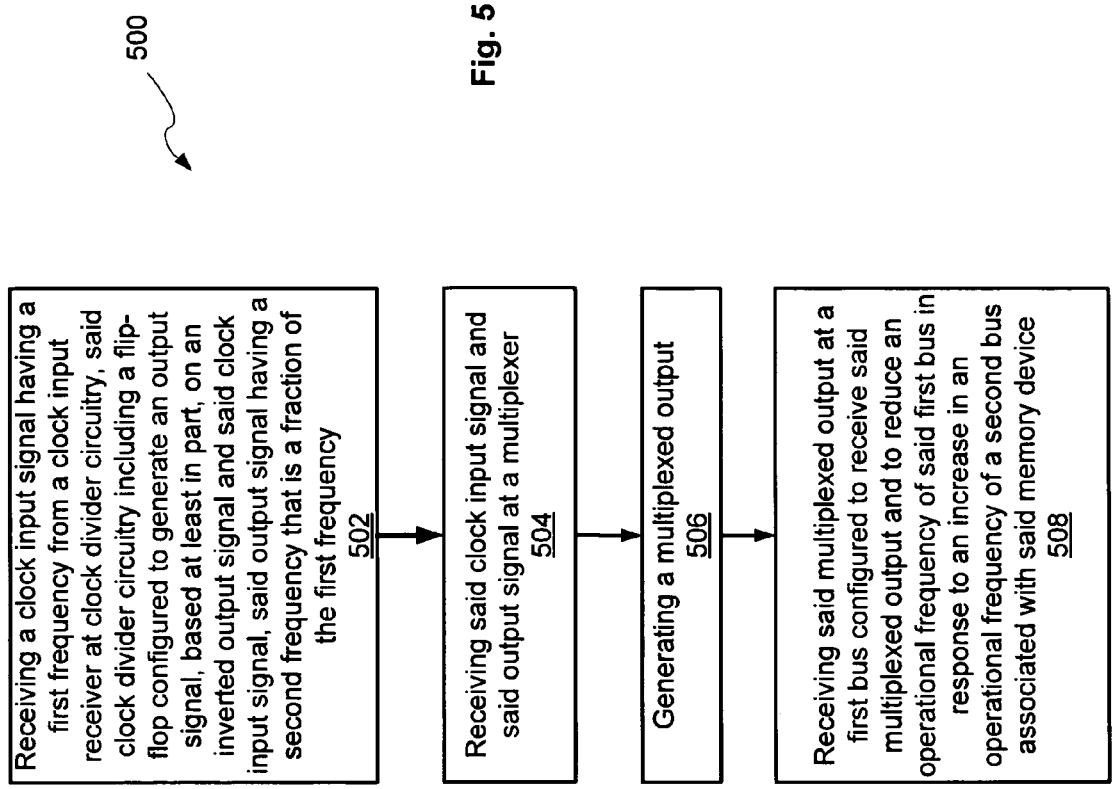

BUS FREQUENCY ADJUSTMENT CIRCUITRY FOR USE IN A DYNAMIC RANDOM ACCESS MEMORY DEVICE

FIELD OF THE DISCLOSURE

The present disclosure relates to bus frequency adjustment circuitry, and more particularly, to bus frequency adjustment circuitry for use in a dynamic random access memory device.

BACKGROUND

A dual in-line memory module "DIMM" may include a number of individual dynamic random access memory "DRAM" chips on a printed circuit board. Each DRAM chip may include a command/address/control bus and may be connected to the motherboard using a separate databus "DQ" having a number of data lines. The double data rate "DDR" command/address/control bus may be routed in parallel with a clock that may be ½ the rate of the data bus. The control timing may be valid on every rising edge of clock (i.e., 1N timing) while the address and command bus may be valid on any rising edge that is qualified by the control signal (e.g., CS# signal). Hence, the address/command bus may be valid for every rising edge of clock (1N), every other rising edge of clock (2N), etc. The address/command bus typically includes more loads as it may cover all the ranks on a DIMM, as well as multiple DIMMs per channel (e.g., a two DIMM per channel system loaded 2R in each slot would have 4x the address/command loading of control, which only has 1 rank loading). The number of ranks on any DIMM may refer to the number of independent sets of DRAMs that may be accessed simultaneously for the full data bit-width of the DIMM to be driven on the bus. Control signals such as chip select "CS#" and on-die termination "ODT" control may be rank specific and may run at faster 1N timings.

As the DQ bus speed increases, the clock and associated command/address/control bus frequencies may also increase. Since there may be a difference in bus architectures and/or loading, the command/address/control bus may be bandwidth limited before the data bus or clocks. For instance, if DDR4 extends the data bus to 3.2 Gigabits per second (Gbps, or simply GT) (EOL frequency target), the maximum clock rate may be 1.6 GHz and the control rate may be 1.6GT (or 800 MHz). The control bus may limit at approximately 1.2GT, which may essentially limit the maximum bandwidth of the entire interface.

According to the Joint Electron Device Engineering Council "JEDEC", one proposed method of solving this problem is to essentially run at a ¼ rate external/internal receive clock frequency. However, the address/command/control buses run at DDR3 rates. This may leave performance on the table as a command cannot be issued per ½ rate clock. This may create a significant problem for the DDR3/DDR4 crossover where DDR4 performance would be hampered by this constraint. One possible method may involve doubling the number of pins, however, the control bus may have a difficult time running at these higher frequencies even with reduced loads.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 5 shows a method having operations in accordance with an exemplary embodiment of the present disclosure.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Generally, this disclosure relates to bus frequency adjustment circuitry for use with a dynamic random access memory (DRAM). The bus frequency adjustment circuitry may be configured to control an address/command/control bus to operate based upon the maximum allowable frequency of the bus. In conventional systems, there may be a difference in bus architectures between the data bus, the clock, and the address, command and control bus. In some cases, the address, command and control bus may be bandwidth limited before the data bus and/or clocks. To address this situation, the address, command and control bus of the present disclosure may include clock divider circuitry, which may allow the bus to operate based upon the maximum allowable frequency of the bus, thus maximizing system performance.

Figure 1:
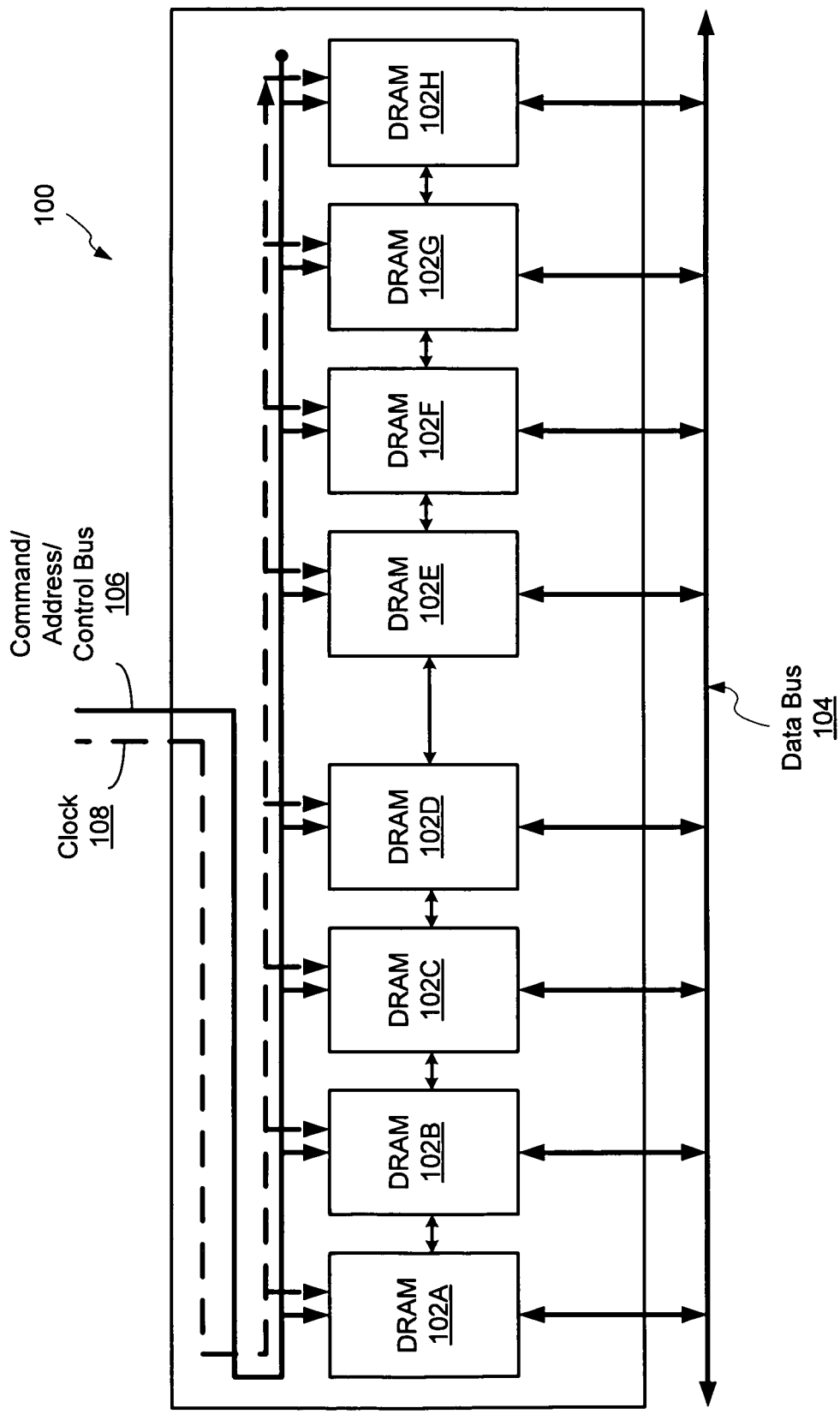
FIG. 1 is a schematic of a dual in line memory module in accordance with an exemplary embodiment of the present disclosure.

Referring now to FIG. 1, an exemplary embodiment of a dual in line memory module ("DIMM") 100 in accordance with the present disclosure is shown. DIMM 100 may include a plurality of memory devices 102A-H. For example, in some embodiments memory devices 102A-H may include dynamic random access memory ("DRAM"). Each individual DRAM may be configured to receive data from a data bus ("DQ") 104. The plurality of DRAMs may also be connected to a command/address/control bus 106, which may be configured to allow the reception of various signals to DRAMs 102A-H. In this example embodiment, the command/address/control bus 106 is shown as a fly-by-bus where the command/address/control bus 106 and their respective clocking signals (generally designated as clock 108) enters in the center, travels to the end of the DIMM 100, and then "fly-by" to the opposite end where the bus 106 is terminated (device 102A receives clock first and 102H last). Such a bus topology is used, for example, in DDR3 style architecture. The specific configuration and components included within each DRAM 102A through 102H is discussed with reference to FIG. 2.

Figure 2:
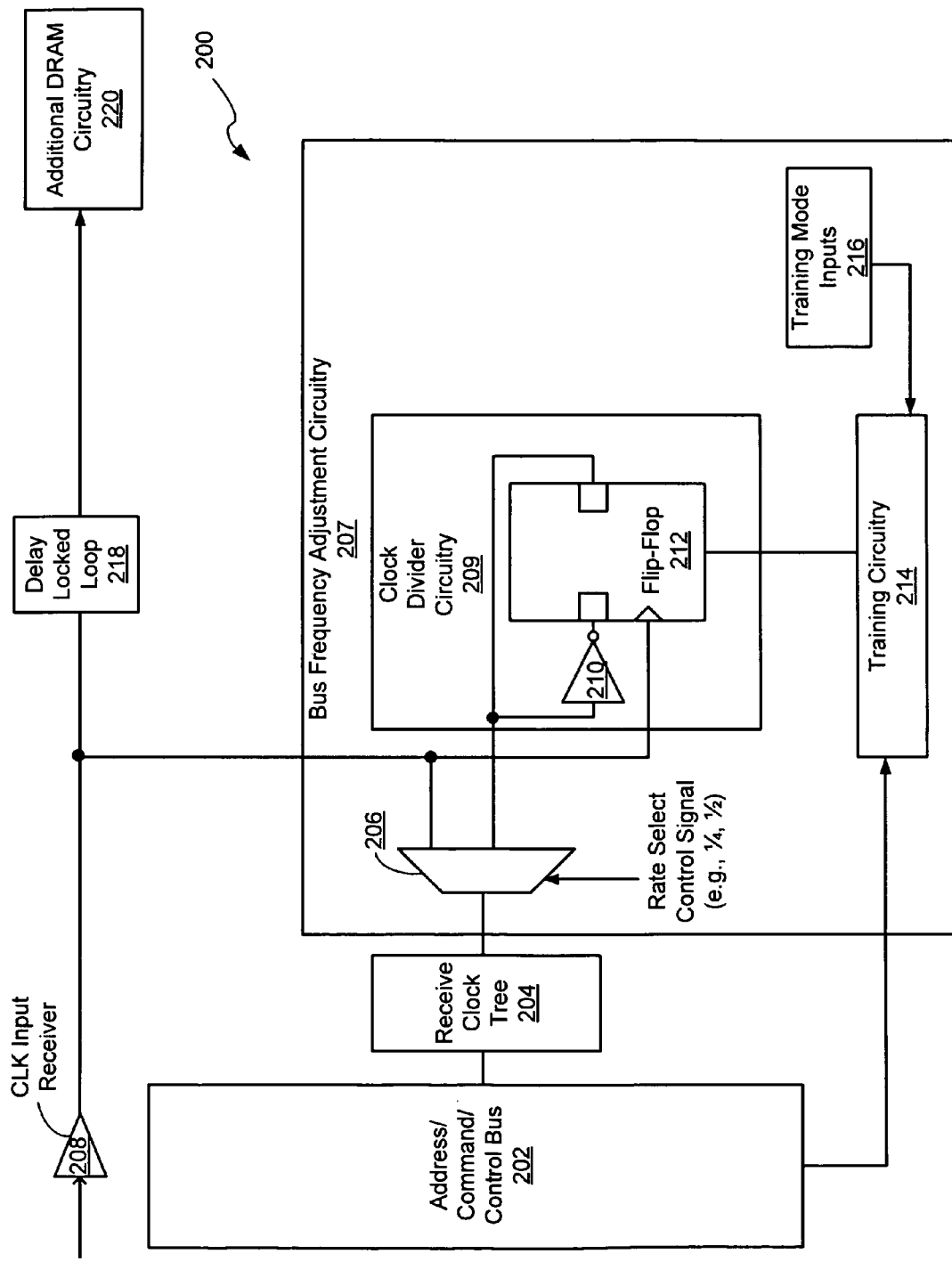
FIG. 2 is a schematic of the bus frequency adjustment circuitry for use in a dynamic random access memory device in accordance with an exemplary embodiment of the present disclosure.

Referring to FIG. 2, an exemplary embodiment of a memory module 200 in accordance with the present disclosure is shown. In some embodiments, memory module 200 may be a DRAM, which itself may be part of a larger system such as the dual in-line memory module (DIMM) shown in FIG. 1. Memory module 200 may include an address/command/control bus 202 configured to allow communication between memory module 200 and various other components. By way of example only, and not by way of limitation, address/command/control bus 202 may be configured to receive control, command and address signals. Access to the addresses, commands, and control signals may occur concurrently for increased efficiency. For instance, the entire bus 202 can be captured, for example, on the rising edge of the corresponding clocking signal.

Address/command/control bus 202 may be in communication with a receive clock tree 204. Receive clock tree 204 operates to capture the address, command and control signals at address/command/control bus 202. In one particular embodiment receive clock tree 204 receives one of two clocks, either a ½ rate clock or a ¼ rate clock, and captures the address, command and control signals at address/command/control bus 202. Other suitable clock frequencies can be used, as will be apparent.

In some embodiments, multiplexer 206 may be included within bus frequency adjustment circuitry 207. Bus frequency adjustment circuitry 207 may be in communication with a clock input receiver 208. Clock input receiver 208 may be configured to receive a clock signal from a memory controller (not shown) and to provide such a clock signal to multiplexer 206 and to clock divider circuitry 209. Multiplexer 206 may also receive an additional input from clock divider circuitry 209.

Clock divider circuitry 209 may be configured to receive a first signal having a first frequency and to generate a second signal having a second frequency. In some embodiments, the second signal may be a fraction of the first signal. For example, the clock divider circuitry 209 may include a divide-by-two circuit. As such, clock divider circuitry 209 may include inverter 210 and flip-flop 212. Flip-flop 212 may be configured to generate an output, which may be provided as feedback to inverter 210. Inverter 210 may then invert the value received and provide that value back to flip-flop 212. Flip-flop 212 may also be configured to receive additional inputs from clock input receiver 208 and training circuitry 214. The output of flip-flop 212 may be sent to multiplexer 206.

As discussed above, clock divider circuitry 209 may operate as a divide-by-two circuit. In this way, clock divider circuitry 209 may receive an input from clock input receiver 208 and inverter 210 may provide an alternating pattern of 0 and 1 at ½ the rate of the input. In some embodiments, clock divider circuitry 209 may be configured to cut the input frequency in half at an unknown phase. Note that other circuits may also be used to achieve a ratio other than ½ of the input frequency (e.g., divide by four circuit for ¼ rate, etc).

Training circuitry 214 may be coupled with clock divider circuitry 209 and may be configured to synchronize the output phase of the internally divided down clock to a desired rising edge of the input clock. Training circuitry 214 may be configured to receive information from address/command/control bus 202. Training circuitry 214 may also be configured to receive training mode inputs 216 and to generate an output, which may be sent to flip flop 212. Training circuitry 214 may reset the clock divider circuitry 209 second frequency as a function of the first input frequency. Training circuitry 214 may also be configured to receive a user-defined training mode input for resetting the second frequency associated with the output of clock divider circuitry 209. In this manner, the second frequency may be configured and the phase may be reset as a function of the training circuitry 214 and the training mode inputs 216.

Training circuitry 214 may be configured to reset flip-flop 212 of clock divider circuitry 209 to align the output phase to a particular input rising clock edge. Training circuitry 214 may be further capable of configuring the clock frequency if more than one frequency is possible. Training circuitry 214 may be configured to synchronize the divided down clock rising edge with the appropriate ½ rate rising edge, as will be explained in turn. Several training methods may be used in accordance with the present disclosure. For example, a strapping pin may be used to set the clock divider circuitry frequency.

In some embodiments, bus frequency adjustment circuitry 207 may be connected to delay-locked-loop "DLL" circuitry 218, which may be configured to change the phase of a particular clock signal. DLL circuitry 218 may be in communication with additional components such as, for example, DRAM circuitry 220. Some DRAM units may not include DLL circuitry. In such cases, the clock from CLK input receiver 208 would drive the additional DRAM circuitry 220.

As discussed above, the output of clock divider circuitry 209 may require synchronization of the output phase. In some embodiments, after power is provided to the device, the DRAM Reset# may default the part to the ½ rate clock input (or other deterministic state). Alternatively, an external pin and/or module strap or a register configuration bit may be used to select the ½ rate or divided down clock. For instance, and in accordance with one such example embodiment, all DRAMs can be connected in parallel and the multiplexer 206 selection can be based on the pin/bit being high or low (e.g., low=½ rate mux selection, and high=¼ rate mux selection). By mux selection, it is meant that the multiplexer 206 is configured to connect the ½ rate clock input or the divided down (¼ rate for this example) mux selection. This is generally shown in FIG. 2 as the rate select control signal input of multiplexer 206. This control signal could also originate from the training circuitry 214. A multiple cycle command may allow a test mode to be written to configure the device for the divided clock input, and place the part in a Synch Pulse mode.

Although this description focuses on the use of the CS# pin to enable the Sync Pulse mode, any appropriate synchronization pin may be used as will be apparent in light of this disclosure. The rate select control signal input of multiplexer 206 may retain the selected state until power is taken away. For the strap option, it may be independent. In one embodiment, a single CS# toggle (no other aggressors) may synchronize the output of clock divider circuitry 209 to the appropriate rising edge. Eliminating aggressors allows the CS# toggle signal to meet higher speed timings, particularly since a single ended bus is cross-talk limited. In one such example embodiment, the appropriate rising edge may be the rising edge that the memory control intends to reference the address, command, and control signals. For example, and with reference to FIG. 4, if the input (external) clock rising edges are numbered 0, 1, 2, 3, etc (from left to right), the appropriate rising edge would be #2, as the control, address and commands are centered around this edge. Edges #1 and #3 are not appropriate, as the address, command and control signals switch on these edges thereby impeding the ability to meet setup and hold times. Such a scheme gives flexibility, such that the synch pulse edge may be sent out around edge #1 in order to synch to edge #2. Or in another example case, sending out on edge #2 would synch 2 clocks later (edge #4). The idea is that a 1 clock cycle wide pulse is sent (centered around the rising edge of a clock to clearly meet setup and hold, as described herein) that allows a particular edge to be synchronized, so it can be identified and subsequent address/command/control can be sent around that edge. This mode may be exited after a number of cycles (e.g., a few clock cycles). Normal operation may proceed using the divided down mode.

In another embodiment, CS# pulses may once again be centered around the desired edge of the clock with ½ cycle setup and ½ cycle hold. Other setup and hold times may be considered as well. Here, only the CS# may toggle (i.e., no address, command). The CS# cycle may be captured by the internal clock divider output. The DQ bus may be configured to output the captured data. For example, if the DQ bus captures a "0", it outputs a "0", if it captures a "1", it outputs a "1". If the Memory Controller (not shown) receives a "0" on the DQ bus, it may be aligned appropriately. However, if the Memory Controller receives a "1" on the DQ bus, it may need to adjust the phase of the clock divider circuitry 209. The memory controller may be configured to send a Phase Adjust command on a pin (e.g., an addr/command pin). A CS# pulse may then be resent to the DRAM, which may receive the CS#. The DRAM may then send the CS# status back to the Memory Controller showing the adjusted phase. The Memory Controller may then send a Mode exit command on one of the pins and the DRAM may exit the synchronization mode. The DRAM may then be configured for normal operation using the divided down mode.

Figure 3:
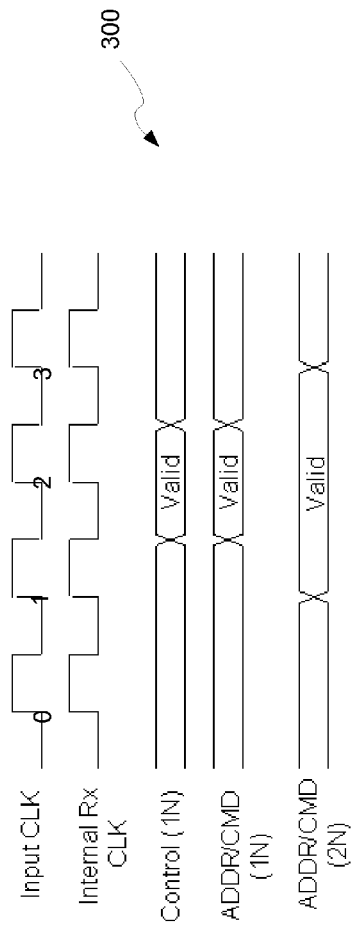
FIG. 3 shows a timing diagram illustrating signals in accordance with conventional bus topology.
Figure 4:
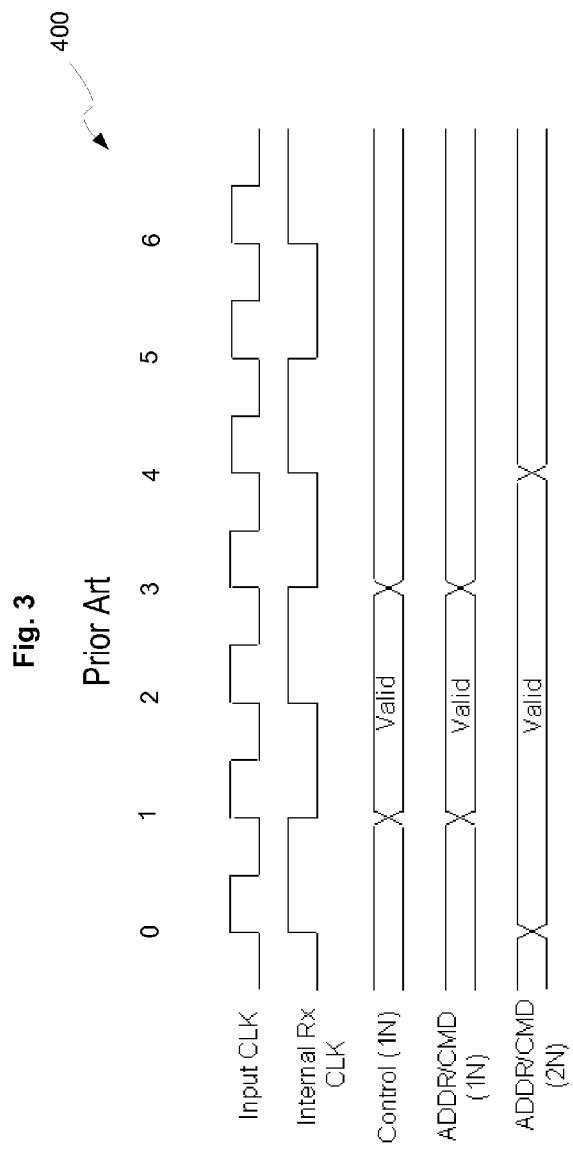
FIG. 4 shows a timing diagram illustrating signals in accordance with an exemplary embodiment of the present disclosure.

Referring now to FIGS. 3 and 4, timing diagrams 300 and 400 for the various signals are provided for both the conventional approach (FIG. 3) as well as for the embodiments described herein (FIG. 4). FIGS. 3-4 use the clock as a reference point, thus address/command and control signals are referenced as valid or invalid with regard to the clock. FIG. 3 further defines the 1N and 2N timing for the external ½ rate clock. As previously discussed, the ½Rate clock is referenced to the DQ bus, as it provides the reference clock for the DRAM transmit. However, in regards to the 1N Control bus, it is actually a full rate clock. FIG. 3 defines a ½ rate external/internal clock as is known in the art.

In contrast, FIG. 4 defines a ½ rate external clock that is converted into a ¼ rate internal rate clock via the clock divider circuitry 209 shown in FIG. 3. At some bandwidths the control signals may not be capable of running 1N. However, the control signals must be capable of running 1N. That is, the control signals must be valid on every rising edge of the clock and cannot span multiple cycles. In contrast, the address and command signals may span multiple cycles, i.e., 2N. At the higher control bus frequencies, the internal divided clock path may be used where the internal clock is ½ the frequency of the input clock. Here, the control signal must be valid on the rising edge of the internal divided clock. Note that the setup time may now be 1 cycle and the hold time may also be 1 cycle. Thus, the required bandwidth may drop by ½ and the control bus may no longer act as a bandwidth limiter at higher Data frequencies.

Referring now to FIG. 5, a method showing operations in accordance with an exemplary embodiment of the present disclosure is provided. Operations 500 may include receiving a clock input signal having a first frequency from a clock input receiver at clock divider circuitry, said clock divider circuitry including a flip-flop configured to generate an output signal, based at least in part, on an inverted output signal and said clock input signal, said output signal having a second frequency that is a fraction of the first frequency (502). Operations may further include receiving said clock input signal and said output signal at a multiplexer (504). Operations may additionally include generating a multiplexed output (506) and receiving said multiplexed output at a first bus configured to receive said multiplexed output and to reduce an operational frequency of said bus in response to an increase in an operational frequency of a second bus associated with said memory device (508). In one such embodiment, this happens at the frequency that the control bus in no longer capable of operating 1N cycles, which will correspond to a DQ frequency rate. The idea is not to limit the frequency of the 2nd bus because of the 1st bus. Other embodiments and operations are also within the scope of the present disclosure.

Accordingly, the present disclosure describes a configurable address/command/control bus optimized for the maximum allowable frequency of the bus. The bus default command rate may be 1N (same as DDR3) where every control signal must be valid on every rising edge of the clock. At the point that the bus is not capable of sustaining this bandwidth, the clock input may be divided to ½ of the input frequency. The "valid" rising clock may be determined via a training method/divider reset, thus making the bus clock essentially a ¼ rate clock. However, since a ½ rate clock may still be received the correct data rate may be available for generating transmit clocks for output (DQ) circuitry. Performance may be optimized as the bus may not slow down until it is necessary. The bus may be configured to run at any ½ rate clock (e.g., DDR3). The present disclosure acts to remove the cmd/addr/ctrl bus from the bandwidth critical path by allowing a lower bus rate option. Therefore, the DQ bus may continue to act as the limiting factor.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A dual in line memory module comprising at least one dynamic random access memory (DRAM) module, said DRAM module comprising:
   clock divider circuitry configured to receive a clock input signal having a first frequency from a clock input receiver, said clock divider circuitry including a flip-flop configured to generate an output signal, based at least in part, on an inverted output signal and said clock input signal, said output signal including a second frequency being a fraction of the first frequency and said inverted output signal based on said clock input signal;
   a multiplexer configured to receive said clock input signal and said output signal and to generate a multiplexed output;
   a receive clock tree configured to receive said multiplexed output; and
   a address/command/control bus configured to receive said multiplexed output and to reduce an operational frequency of said address/command/control bus in response to an increase in an operational frequency of a data bus associated with said dual in line memory module.

2. The dual in line memory module according to claim 1, further comprising training circuitry configured to reset said clock divider circuitry and to align output phase of said output signal with input phase of said clock input signal.

3. The dual in line memory module according to claim 1, wherein said clock divider circuitry includes a divide-by-two circuit.

4. The dual in line memory module according to claim 1, wherein said address/command/control bus provides feedback to a training circuitry.

5. The dual in line memory module according to claim 1, wherein said clock input receiver is configured to receive said clock input signal from a memory controller.

6. The dual in line memory module according to claim 1, wherein said second frequency is half of the rate of said first frequency.

7. The dual in line memory module according to claim 2, wherein a rising edge of said output signal is aligned with a rising edge of said input signal.

8. A method comprising:
receiving a clock input signal having a first frequency from a clock input receiver at clock divider circuitry of at least one dynamic random access memory (DRAM) module of a dual in line memory module, said clock divider circuitry including a flip-flop configured to generate an output signal, based at least in part, on an inverted output signal and said clock input signal, said output signal having a second frequency that is a fraction of the first frequency and said inverted output signal based on said clock input signal;
receiving said clock input signal and said output signal at a multiplexer of said DRAM module;
generating a multiplexed output with said multiplexer;
receiving said multiplexed output with a receive clock tree of said DRAM module; and
receiving said multiplexed output at an address/command/control bus of said DRAM module, said address/command/control bus configured to receive said multiplexed output and to reduce an operational frequency of said address/command/control bus in response to an increase in an operational frequency of a data bus associated with said dual in line memory module.

9. The method according to claim 8, further comprising resetting said clock divider circuitry via training circuitry, said training circuitry configured to align output phase of said output signal with input phase of said clock input signal.

10. The method according to claim 8, wherein said clock divider circuitry includes a divide-by-two circuit.

11. The method according to claim 8, further comprising providing feedback to a training circuitry via said address/command/control bus.

12. The method according to claim 8, wherein said clock input receiver is configured to receive said clock input signal from a memory controller.

13. The method according to claim 8, wherein said second frequency is half of the rate of said first frequency.

14. The method according to claim 9, further comprising aligning a rising edge of said output signal with a rising edge of said input signal.

15. A dual in line memory module comprising:
a plurality of dynamic random access memory (DRAM) modules, each DRAM module comprising:
clock divider circuitry configured to receive a clock input signal having a first frequency from a clock input receiver, said clock divider circuitry including a flip-flop configured to generate an output signal, based at least in part, on an inverted output signal and said clock input signal, said output signal including a second frequency being a fraction of the first frequency and said inverted output signal based on said clock input signal;
a multiplexer configured to receive said clock input signal and said output signal and to generate a multiplexed output;
a receive clock tree configured to receive said multiplexed output; and
a address/command/control bus configured to receive said multiplexed output and to reduce an operational frequency of said address/command/control bus in response to an increase in an operational frequency of a data bus associated with a said dual in line memory module.

16. The dual in line memory module according to claim 15, further comprising training circuitry configured to reset said clock divider circuitry and to align output phase of said output signal with input phase of said clock input signal.

17. The dual in line memory module according to claim 15, wherein said clock divider circuitry includes a divide-by-two circuit.

18. The dual in line memory module according to claim 15, wherein said address/command/control bus provides feedback to a training circuitry.

19. The dual in line memory module according to claim 15, wherein said clock input receiver is configured to receive said clock input signal from a memory controller.

20. The dual in line memory module according to claim 15, wherein said second frequency is half of the rate of said first frequency.

* * * * *

UNITED STATES PATENT AND TRADEMARK OFFICE
CERTIFICATE OF CORRECTION

PATENT NO. : 8,458,507 B2
APPLICATION NO. : 12/163663
DATED : June 4, 2013
INVENTOR(S) : Joe Salmon et al.

It is certified that error appears in the above-identified patent and that said Letters Patent is hereby corrected as shown below:

In the Claims:

In column 8, line 31, in claim 15, after "with" delete "a".

Signed and Sealed this
Thirteenth Day of August, 2013

Teresa Stanek Rea
*Acting Director of the United States Patent and Trademark Office*